(12) United States Patent
Hirayama et al.

(10) Patent No.: US 8,935,854 B2
(45) Date of Patent: Jan. 20, 2015

(54) METHOD OF MANUFACTURING HEAT EXCHANGER

(71) Applicant: Keihin Thermal Technology Corporation, Oyama (JP)

(72) Inventors: Takashi Hirayama, Oyama (JP); Atsuo Ohashi, Oyama (JP)

(73) Assignee: Keihin Thermal Technology Corporation, Oyama-shi (JP)

( * ) Notice: Subject to any disclaimer, the term of this patent is extended or adjusted under 35 U.S.C. 154(b) by 214 days.

(21) Appl. No.: 13/626,907

(22) Filed: Sep. 26, 2012

(65) Prior Publication Data

US 2013/0074340 A1 Mar. 28, 2013

(30) Foreign Application Priority Data

Sep. 28, 2011 (JP) .................. 2011-212771

(51) Int. Cl.
| | |
|---|---|
| B21D 53/02 | (2006.01) |
| B21D 53/08 | (2006.01) |
| B23P 15/26 | (2006.01) |
| F28F 9/02 | (2006.01) |
| F28D 1/053 | (2006.01) |
| F28D 21/00 | (2006.01) |

(52) U.S. Cl.
CPC ............... B21D 53/08 (2013.01); B23P 15/26 (2013.01); F28F 9/0214 (2013.01); F28F 9/0217 (2013.01); F28F 9/0278 (2013.01); F28D 1/05391 (2013.01); F28D 2021/0085 (2013.01); F28F 2275/122 (2013.01)
USPC ............... 29/890.03; 29/890.031; 29/890.052

(58) Field of Classification Search
CPC ....... B23P 15/26; B23P 6/00; H01L 21/4882; F28F 11/02; F28F 9/0243; F28F 9/0212
USPC ......... 29/890.03, 890.031, 890.032, 890.038, 29/890.039, 890.04, 890.043, 890.045, 29/890.052, 890.053, 890.054, 505, 509, 29/515, 520, 521
See application file for complete search history.

(56) References Cited

U.S. PATENT DOCUMENTS

| | | | | |
|---|---|---|---|---|
| 5,720,340 | A  * | 2/1998 | Ohara et al. ................... | 165/133 |
| 6,736,197 | B2 * | 5/2004 | Nozaki et al. ................. | 165/149 |
| 7,657,986 | B2 * | 2/2010 | Anders et al. .................. | 29/413 |

FOREIGN PATENT DOCUMENTS

JP 2003-214794 A 7/2003

* cited by examiner

*Primary Examiner* — Ryan J Walters
(74) *Attorney, Agent, or Firm* — Edwards Wildman Palmer LLP (57) ABSTRACT

A method of manufacturing a heat exchanger includes forming elongated holes in two connection walls among a plurality of connection walls to be laminated, and forming paired notches on a claw forming portion of the remaining connection wall facing the elongated holes. A longitudinally intermediate portion of the claw forming portion is pressed toward the other end to break the claw forming portion at the longitudinal center and bend the claw forming portion at the notches to thereby form two claws forming pieces and form bent portions at the distal ends of the claws forming pieces. The claws forming pieces are bent at the notches to form claws. Distal end portions of the claws are bent outward to form fold-back portions, which are engaged with the outer surface of the connection wall at the other end, whereby all the connection walls are provisionally fixed together.

5 Claims, 10 Drawing Sheets

METHOD OF MANUFACTURING HEAT EXCHANGER

BACKGROUND OF THE INVENTION

The present invention relates to a method of manufacturing a heat exchanger suitably used as an evaporator of a car air conditioner, which is a refrigeration cycle to be mounted on an automobile, for example.

A heat exchanger which is used for an evaporator of a car air conditioner has been known (Japanese Patent Application Laid-Open (kokai) No. 2003-214794). The known heat exchanger includes a pair of header tanks disposed apart from each other, and a plurality of heat exchange tubes which are disposed between the two header tanks and whose opposite end portions are connected to the corresponding header tanks. At least one of the header tanks is composed of a first tank constituting member to which the heat exchange tubes are connected, and a second tank constituting member which is joined to the first tank constituting member and which covers one side of the first tank constituting member opposite the heat exchange tubes. The two tank constituting members have plate-shaped portions which are laminated to form a lamination portion. In the lamination portion composed of the two plate-shaped portions, claws provided on the first plate-shaped portion disposed at one end with respect to the lamination direction are passed through elongated through-holes which are formed in the other or second plate-shaped portion and which extend in the longitudinal direction of the header tanks. Each claw is engaged with the outer surface (with respect to the lamination direction) of the second plate-shaped portion at one end of the corresponding elongated hole with respect to the longitudinal direction. In this state, the plate-shaped portions of the two tank constituting members which constitute the corresponding header tank are brazed together.

The heat exchanger disclosed in the publication has been manufactured by a method which includes forming elongated holes (through-holes) in the second plate-shaped portion of one tank constituting member such that the longitudinal direction of the elongated holes coincides with the longitudinal direction of the header tanks; laminating the plate-shaped portions of the two tank constituting members; and punching the first plate-shaped portion of the other tank constituting member so as to simultaneously form elongated holes (through-holes) whose longitudinal direction coincides with the longitudinal direction of the header tanks, and a claw at one end of each elongated hole. The claw engages with the second plate-shaped portion, whereby the two tank constituting members are provisionally fixed together.

However, the method of manufacturing a heat exchanger disclosed in the publication has a problem in that, when claws are formed, cracks may be formed in the claws and the claws may break, which decreases the joint strength of the two tank constituting members provisionally fixed together.

SUMMARY OF THE INVENTION

An object of the present invention is to solve the above-described problem and to provide a method of manufacturing a heat exchanger, which method enables tank constituting members to be firmly joined together through provisional fixing in a process of manufacturing the heat exchanger.

To fulfill the above object, the present invention comprises the following modes.

1) A method of manufacturing a heat exchanger which includes a pair of header tanks disposed apart from each other, and a plurality of heat exchange tubes which are disposed between the two header tanks and whose opposite end portions are connected to the corresponding header tanks, wherein at least one of the header tanks is formed by a plurality of tank constituting members having plate-shaped portions which are laminated to form a lamination portion, and, at the lamination portion composed of the plurality of plate-shaped portions, at least two claws provided on a first plate-shaped portion disposed at one end of the lamination portion with respect to the lamination direction are passed through elongated holes in the form of a through-hole which are formed in the remaining plate-shaped portions and which extend in the longitudinal direction of the header tanks, the claws are bent such that distal end portions of the claws are engaged with an outer surface, with respect to the lamination direction, of a second plate-shaped portion disposed at the other end of the lamination portion with respect to the lamination direction, at positions corresponding to opposite ends of the elongated holes with respect to the longitudinal direction, and the plate-shaped portions of the plurality of tank constituting members are brazed together in this state, the method comprising:

forming elongated holes in the form of a through hole in all the plate-shaped portions which constitute the lamination portion, excluding the first plate-shaped portion, such that each of the elongated holes extends in the longitudinal direction of the header tank and has a length at least two times a dimension obtained by subtracting a thickness of the first plate-shaped portion from a thickness of the lamination portion;

forming bending notches on a surface of a claw forming portion of the first plate-shaped portion which faces the elongated holes, the surface facing the adjacent plate-shaped portion, such that one bending notch is formed at one end of each elongated hole with respect the longitudinal direction or at a position shifted from the one end toward the inside of the elongated hole, and another bending notch is formed at the other end of the elongated hole with respect the longitudinal direction or at a position shifted from the other end toward the inside of the elongated hole;

pressing an intermediate portion of the claw forming portion of the first plate-shaped portion with respect to the longitudinal direction toward the other end with respect to the lamination direction of the plurality of plate-shaped portions so as to break the claw forming portion at a center with respect to the longitudinal direction and bend the claw forming portion at the notches, to thereby form two claws forming pieces which incline toward the other end in the lamination direction as approaching distal end thereof and to form bent portions at the distal ends of the claws forming pieces such that the bent portions are bent outward in relation to the claws forming pieces;

laminating the plate-shaped portions of all the tank constituting members such that the elongated holes of the plate-shaped portions, excluding the first plate-shaped portion, positionally coincide with each other, and the claws forming pieces of the first plate-shaped portion are located in the elongated holes of the remaining plate-shaped portions;

bending the claws forming pieces of the first plate-shaped portion at the notches toward the other end in the lamination direction so as to form claws which are in close contact with a wall surface of each elongated hole at opposite ends thereof and to cause distal end portions of the claws to project outward from the second plate-shaped portion in the lamination direction; and bending portions of the claws of the first plate-shaped portion, the portions projecting outward from the second plate-shaped portion, toward the outside of the elongated holes with respect to the longitudinal direction thereof so as to form fold-back portions, and bringing the fold-back portions into contact with an outer surface of the second plate-shaped portion with respect to the lamination direction, whereby all the tank constituting members are provisionally fixed together.

2) A method of manufacturing a heat exchanger according to par. 1), wherein a relation $0.1T \leq D \leq 0.5T$ is satisfied, where D represents the depth of the notches formed on the first plate-shaped portion, and T represents the thickness of the first plate-shaped portion.

3) A method of manufacturing a heat exchanger according to par. 1), wherein each of the notches formed on the first plate-shaped portion has a V-shaped transverse cross section, and an angle formed between two side surface of each notch as measured on the transverse cross section is 30 to 120 degrees.

4) A method of manufacturing a heat exchanger according to par. 1), wherein notches for forming the bent portions on the claws are formed on the claw forming portion of the first plate-shaped portion which faces the elongated holes.

5) A method of manufacturing a heat exchanger according to par. 1), wherein the heat exchanger includes a header tank which is composed of a first tank constituting member to which the heat exchange tubes are connected, a second tank constituting member which is joined to the first tank constituting member and which covers a side of the first tank constituting member opposite the heat exchange tubes, and a third tank constituting member which is disposed between the first tank constituting member and the second tank constituting member; and the plate-shaped portions, which are laminated to form the lamination portion, are provided on the first through third tank constituting members, the notches are formed on the plate-shaped portion of the first tank constituting member or the second tank constituting member, and the elongated holes are formed in the plate-shaped portions of the remaining tank constituting members.

The manufacturing method of any one of pars. 1) to 5) includes:

forming elongated holes in the form of a through hole in all the plate-shaped portions which constitute the lamination portion, excluding the first plate-shaped portion, such that each of the elongated holes extends in the longitudinal direction of the header tank and has a length at least two times a dimension obtained by subtracting a thickness of the first plate-shaped portion from a thickness of the lamination portion;

forming bending notches on a surface of a claw forming portion of the first plate-shaped portion which faces the elongated holes, the surface facing the adjacent plate-shaped portion, such that one bending notch is formed at one end of each elongated hole with respect the longitudinal direction or at a position shifted from the one end toward the inside of the elongated hole, and another bending notch is formed at the other end of the elongated hole with respect the longitudinal direction or at a position shifted from the other end toward the inside of the elongated hole;

pressing an intermediate portion of the claw forming portion of the first plate-shaped portion with respect to the longitudinal direction toward the other end with respect to the lamination direction of the plurality of plate-shaped portions so as to break the claw forming portion at a center with respect to the longitudinal direction and bend the claw forming portion at the notches, to thereby form two claws forming pieces which incline toward the other end in the lamination direction as approaching distal end thereof and to form bent portions at the distal ends of the claws forming pieces such that the bent portions are bent outward in relation to the claws forming pieces;

laminating the plate-shaped portions of all the tank constituting members such that the elongated holes of the plate-shaped portions, excluding the first plate-shaped portion, positionally coincide with each other, and the claws forming pieces of the first plate-shaped portion are located in the elongated holes of the remaining plate-shaped portions;

bending the claws forming pieces of the first plate-shaped portion at the notches toward the other end in the lamination direction so as to form claws which are in close contact with a wall surface of each elongated hole at opposite ends thereof and to cause distal end portions of the claws to project outward from the second plate-shaped portion in the lamination direction; and bending portions of the claws of the first plate-shaped portion, the portions projecting outward from the second plate-shaped portion, toward the outside of the elongated holes with respect to the longitudinal direction thereof so as to form fold-back portions, and bringing the fold-back portions into contact with an outer surface of the second plate-shaped portion with respect to the lamination direction, whereby all the tank constituting members are provisionally fixed together.

Therefore, when the two claws forming pieces which incline toward the other end in the lamination direction as approaching the distal ends thereof and when the distal end portions of the claws forming pieces of the first plate-shaped portion are caused to project outward from the second plate-shaped portion with respect to the lamination direction, breakage of the claws forming pieces can be prevented by the action of the notches. Therefore, it is possible to firmly and provisionally fix all the tank constituting members, through use of the claws formed from the claws forming pieces, in a process of manufacturing the heat exchanger.

According to the manufacturing method of par. 4), when the bent portions are formed at the distal ends of the two claws forming pieces and when the bent portions at the distal ends of the two claws forming pieces are bent toward the outside of the elongated holes with respect to the longitudinal direction to form fold-back portions and the fold-back portions are engaged with the outer surface of the second plate-shaped portion with respect to the lamination direction so as to provisionally fix all the tank constituting members, the bent portions do not break. Therefore, it is possible to firmly and provisionally fix the plurality of tank constituting members in a process of manufacturing the heat exchanger.

DESCRIPTION OF THE PREFERRED EMBODIMENT

An embodiment of the present invention will next be described with reference to the drawings. In this embodiment, the method according to the present invention is applied to manufacture of an evaporator of a car air conditioner.

In the following description, the downstream side (a direction represented by arrow X in the drawing) of an air flow through air-passing clearances between adjacent heat exchange tubes will be referred to as the "front," and the opposite side as the "rear." Also, in the following description, the upper, lower, left-hand, and right-hand sides of FIG. 2 will be referred to as "upper," "lower," "left," and "right," respectively.

The term "aluminum" as used in the following description encompasses aluminum alloys in addition to pure aluminum.

Figure 1:
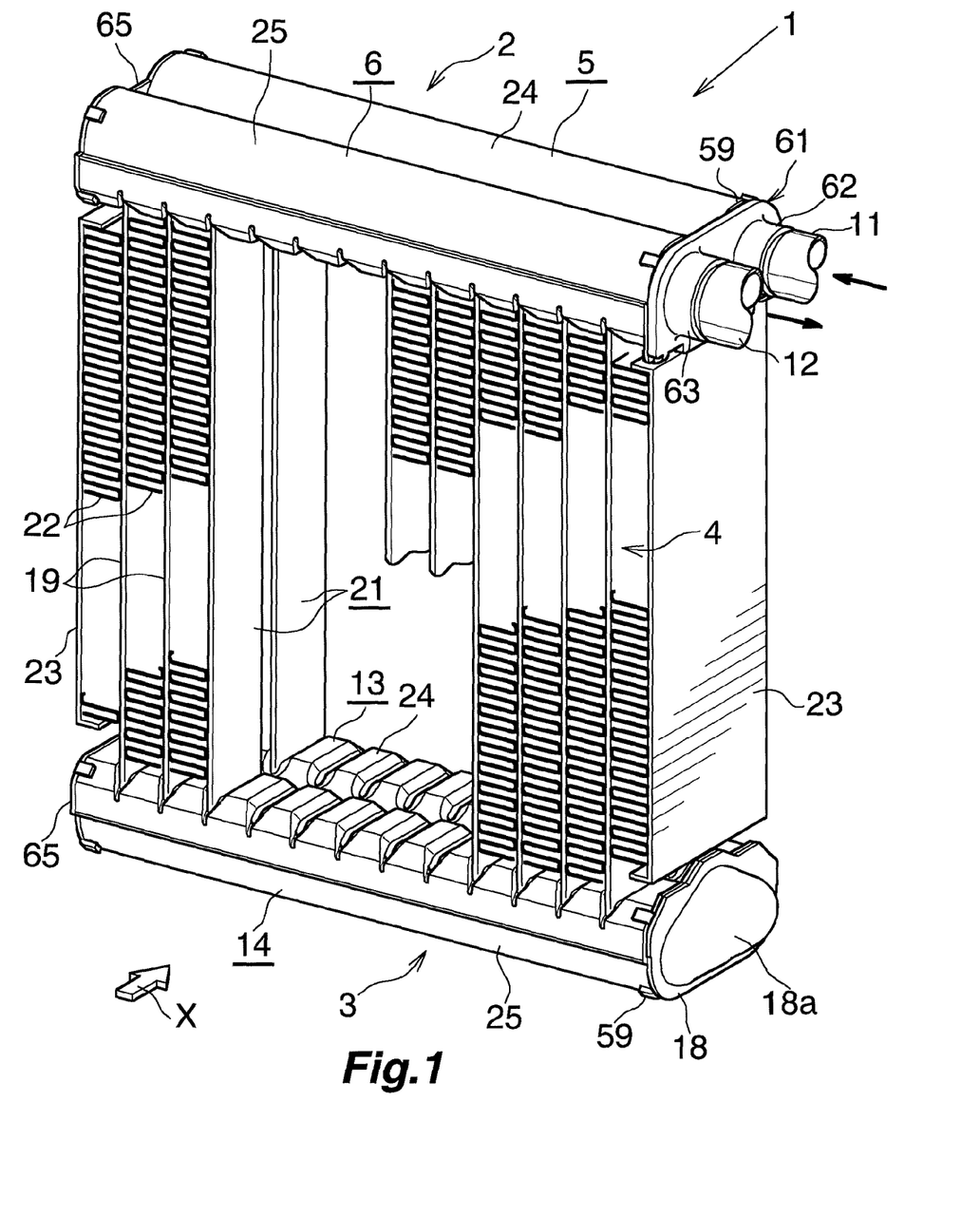
FIG. 1 is a partially cut-away perspective view showing the overall structure of an evaporator which is composed of a heat exchanger manufactured by the method of the present invention.
Figure 2:
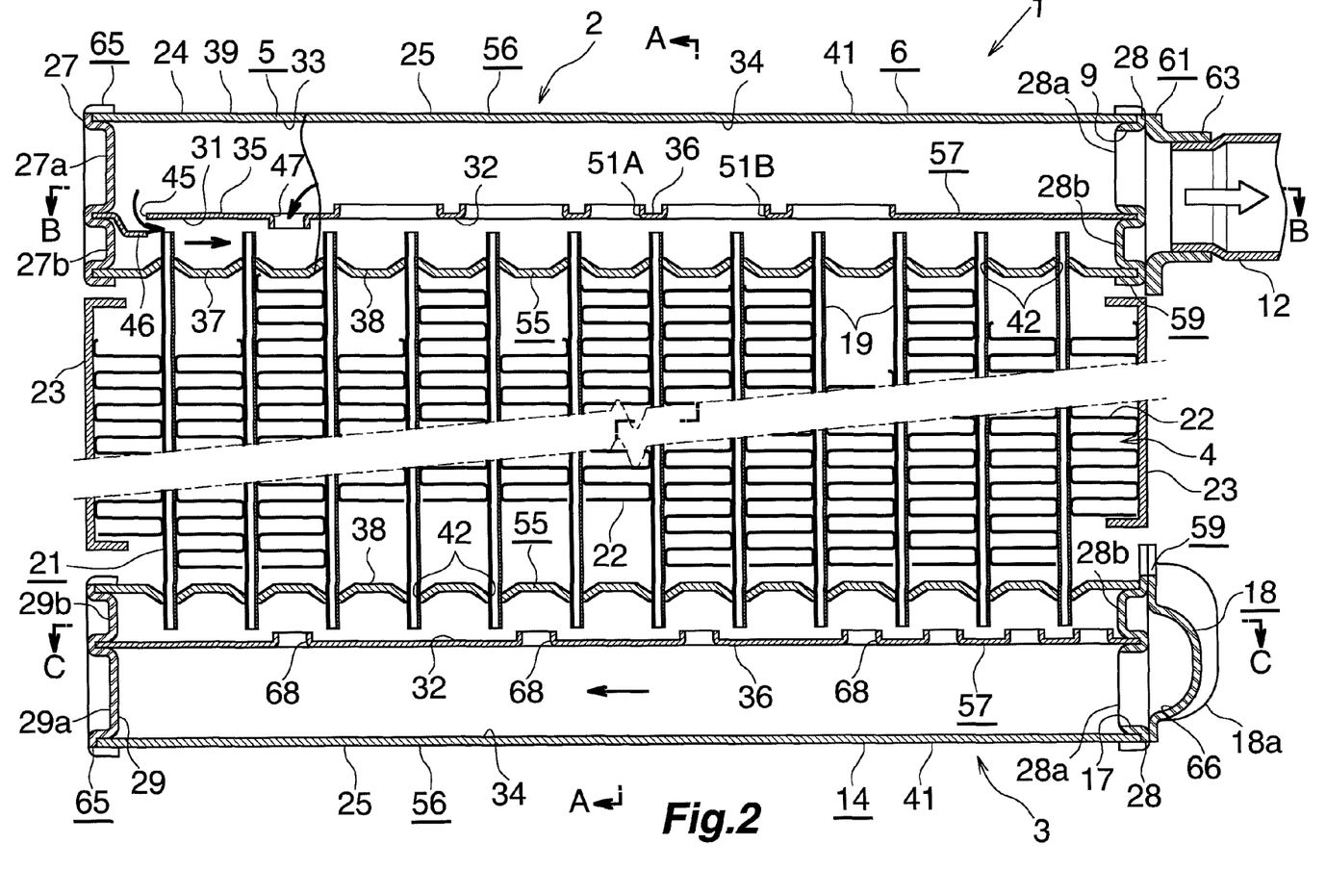
FIG. 2 is a partially omitted vertical sectional view of the evaporator of FIG. 1 as viewed from the rear side thereof.
Figure 3:
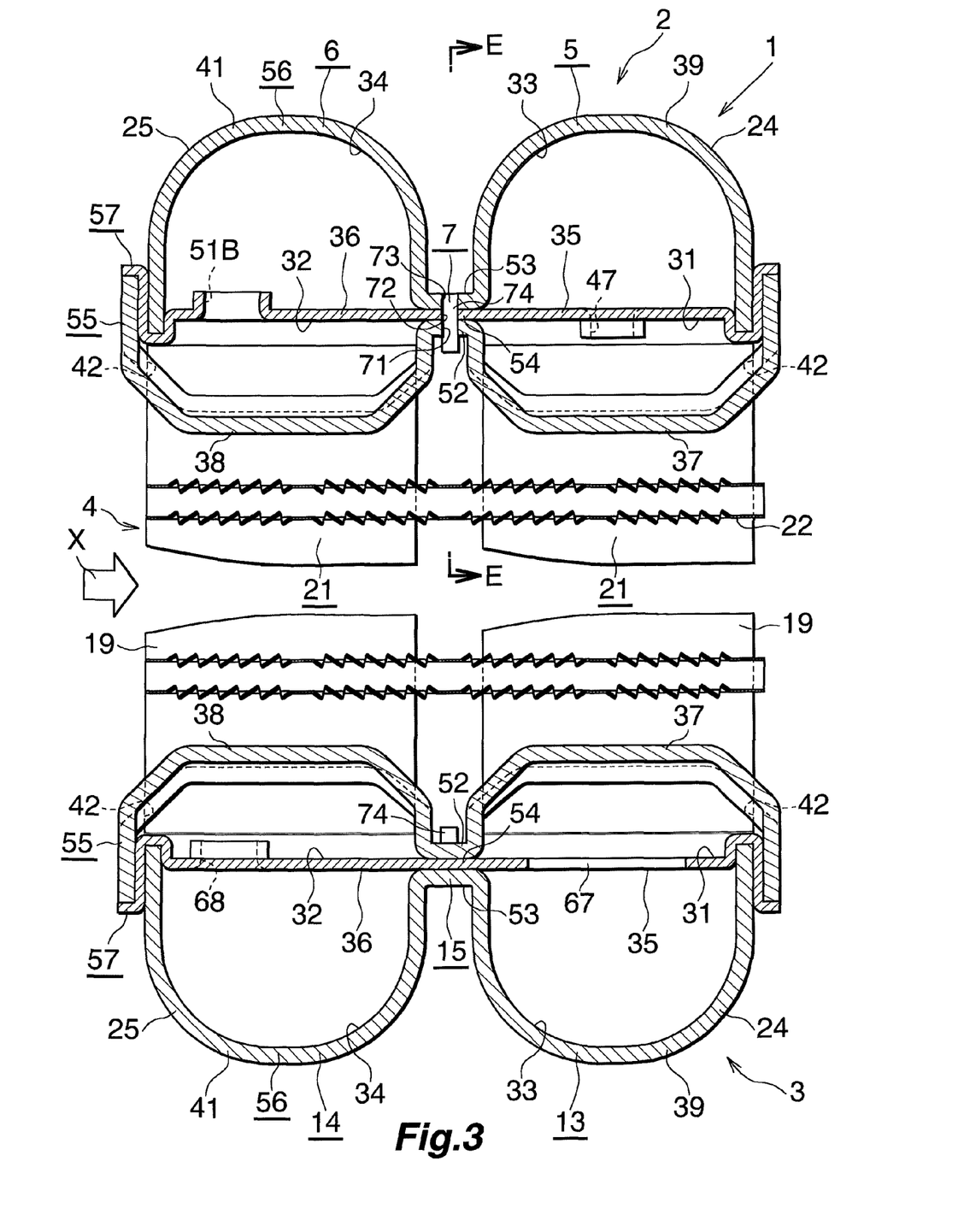
FIG. 3 is a partially omitted enlarged sectional view taken along line A-A of FIG. 2.

FIGS. 1 to 3 show the overall structure of an evaporator, and FIGS. 4 to 8 show the configuration of an essential portion of the evaporator.

As shown in FIGS. 1 to 5, an evaporator 1 includes a first header tank 2 and a second header tank 3 formed of aluminum and disposed apart from each other in the vertical direction such that they extend in the left-right direction; and a heat exchange core section 4 provided between the two header tanks 2 and 3.

The first header tank 2 includes a leeward upper header section 5 which is located on the front side (downstream side with respect to the air-passing direction) and which extends in the left-right direction; a windward upper header section 6 which is located on the rear side and which extends in the left-right direction; and a connection portion 7 which connects and unites the two header sections 5 and 6 together. The leeward upper header section 5 of the first header tank 2 has a refrigerant inflow port 8 at its right end, and the left end of the leeward upper header section 5 is closed. Similarly, the windward upper header section 6 of the first header tank 2 has a refrigerant outflow port 9 at its right end, and the left end of the windward upper header section 6 is closed. A refrigerant inlet pipe 11 formed of aluminum is connected to the leeward upper header section 5 of the first header tank 2 such that the refrigerant inlet pipe 11 communicates with the refrigerant inflow port 8. Similarly, a refrigerant outlet pipe 12 formed of aluminum is connected to the windward upper header section 6 of the first header tank 2 such that the refrigerant outlet pipe 12 communicates with the refrigerant outflow port 9.

The second header tank 3 includes a leeward lower header section 13 which is located on the front side and which extends in the left-right direction; a windward lower header section 14 which is located on the rear side and which extends in the left-right direction; and a connection portion 15 which connects and unites the two header sections 13 and 14 together. The leeward lower header section 13 of the second header tank 3 has a refrigerant outflow port 16 at its right end, and the left end of the leeward lower header section 13 is closed. Similarly, the windward lower header section 14 of the second header tank 3 has a refrigerant inflow port 17 at its right end, and the left end of the windward lower header section 14 is closed. The refrigerant outflow port 16 of the leeward lower header section 13 and the refrigerant inflow port 17 of the windward lower header section 14 communicate with each other through a communication member 18 which is brazed to the right end of the second header tank 3 such that the communication member 18 extends over the two lower header sections 13 and 14.

The heat exchange core section 4 is configured such that heat exchange tube groups 21 are arranged in a plurality of; herein, two, rows in the front-rear direction, each heat exchange tube group 21 consisting of a plurality of heat exchange tubes 19 arranged in parallel at predetermined intervals in the left-right direction such that the width direction of the heat exchange tubes 19 coincides with the front-rear direction and the longitudinal direction of the heat exchange tubes 19 coincides with the vertical direction. Corrugate fins 22 are disposed within corresponding air-passing clearances between the adjacent heat exchange tubes 19 of the heat exchange tube groups 21 and on the outer sides of the leftmost and rightmost heat exchange tubes 19 of the heat exchange tube groups 21, and are brazed to the corresponding heat exchange tubes 19. Side plates 23 made of aluminum are disposed on the outer sides of the leftmost and rightmost corrugate fins 22, and are brazed to the corresponding corrugate fins 22. Upper and lower end portions of the heat exchange tubes 19 of the front heat exchange tube group 21 are connected to the leeward upper header section 5 and the leeward lower header section 13, respectively. Upper and lower end portions of the heat exchange tubes 19 of the rear heat exchange tube group 21 are connected to the windward upper header section 6 and the windward lower header section 14, respectively. The corrugate fins 22 are shared by the front and rear heat exchange tubes 19 which constitute the front and rear heat exchange tube groups 21, and the width of the corrugate fins 22 in the front-rear direction is approximately equal to the distance between the front side edges of the front heat exchange tubes 19 and the rear side edges of the rear heat exchange tubes 19.

Figure 4:
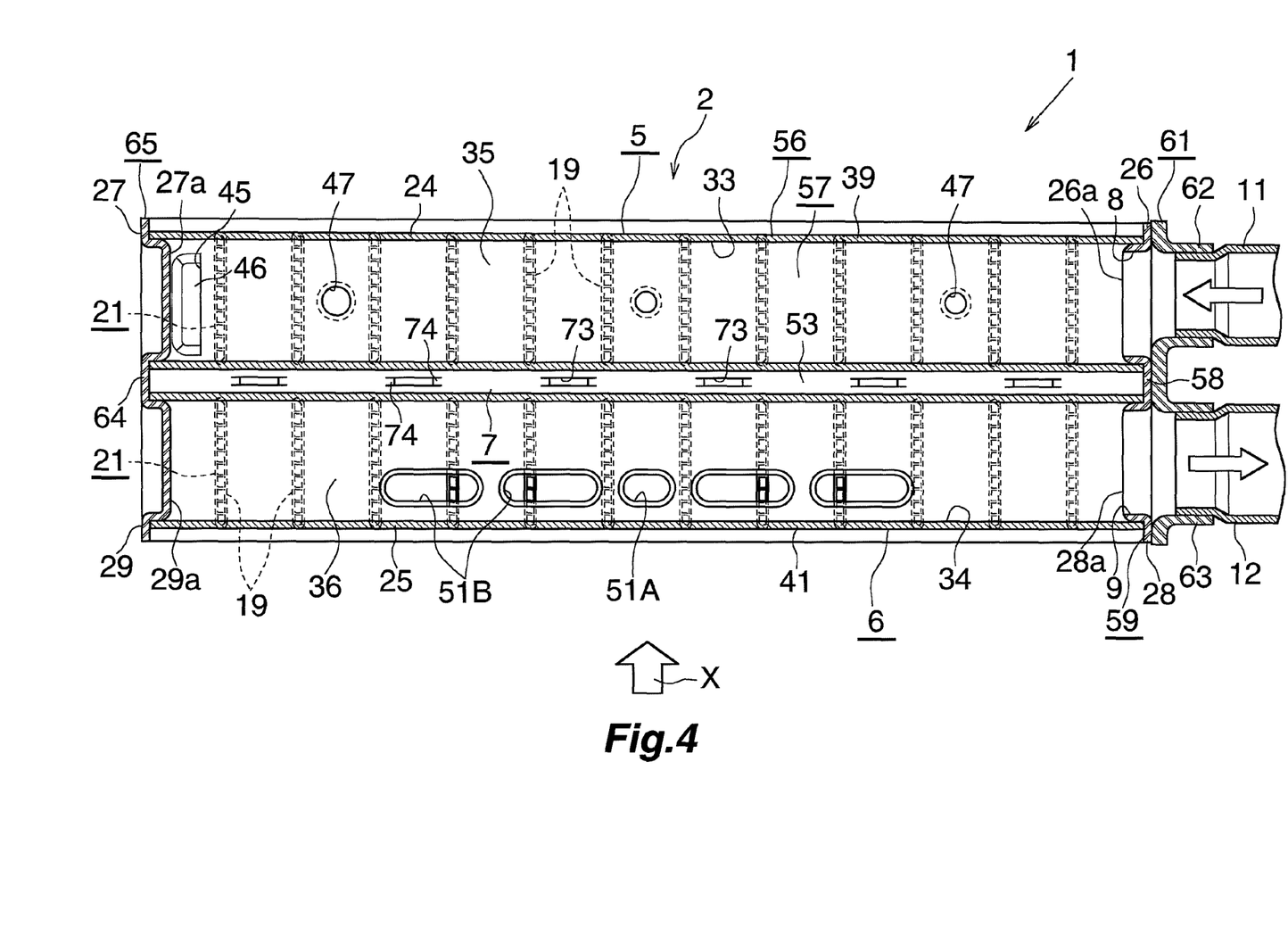
FIG. 4 is a sectional view taken along line B-B of FIG. 2.
Figure 5:
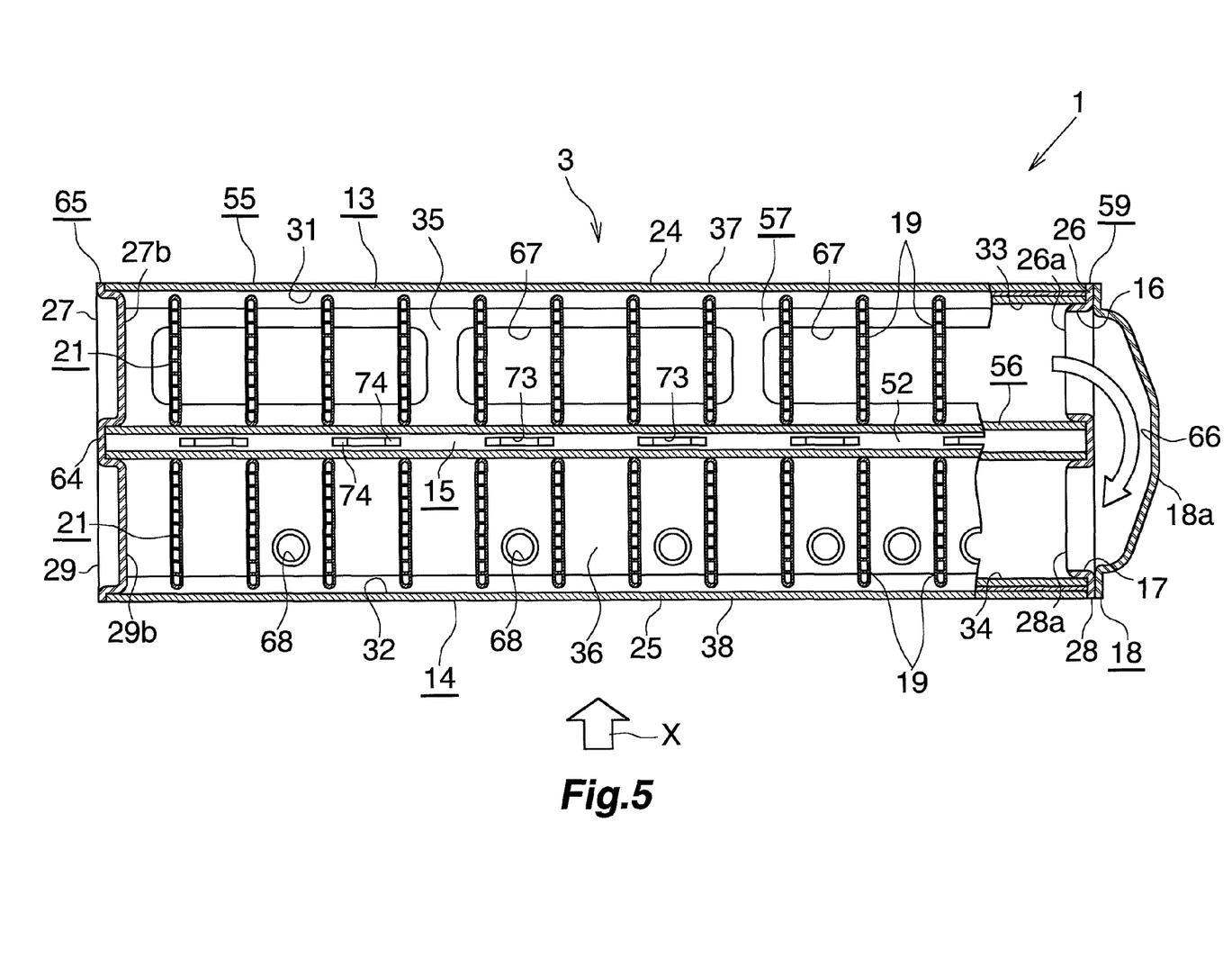
FIG. 5 is a sectional view taken along line C-C of FIG. 2.

The leeward upper header section 5 of the first header tank 2 is composed of a header section main body 24 which is open at opposite ends thereof, caps 26 and 27 which close openings provided at the opposite ends of the header section main body 24, and a partition member 35 which divides the interior of the header section main body 24 into a first space 31 which is located on the lower side and with which the heat exchange tubes 19 communicate and a second space 33 located on the upper side. Similarly, the windward upper header section 6 of the first header tank 2 is composed of a header section main body 25 which is open at opposite ends thereof, caps 28 and 29 which close openings provided at the opposite ends of the header section main body 25, and a partition member 36 which divides the interior of the header section main body 25 into a first space 32 which is located on the lower side and with which the heat exchange tubes 19 communicate and a second space 34 located on the upper side.

Each header section main body 24 (25) includes a first member 37 (38) having a generally U-shaped transverse cross section, and a second member 39 (41) having a generally inverted-U-shaped transverse cross section. The first member 37 (38) forms a lower portion of the corresponding header section main body 24 (25), and upper end portions of the heat exchange tubes 19 of the front (rear) heat exchange tube group 21 are connected to the first member 37 (38). The second member 39 (41) forms an upper portion of the corresponding header section main body 24 (25), and is brazed to the first member 37 (38). The partition member 35 (36) is disposed between the first member 37 (38) and the second member 39 (41) and is brazed to the two members 37 and 39 (38 and 41). A plurality of tube insertion holes 42 elongated in the front-rear direction are formed in each of the first members 37 and 38 of the header section main bodies 24 and 25 of the leeward upper header section 5 and the windward upper header section 6 such that the tube insertion holes 42 are spaced from each other in the left-right direction, and the tube insertion holes 42 of the first member 37 are located at the same positions as those of the first member 38 with respect to the left-right direction. The upper end portions of the heat exchange tubes 19 are inserted into the tube insertion holes 42 and are brazed to the first members 37 and 38.

As shown in FIGS. 2 to 4 and 7, a rectangular communication opening 45 is formed in the partition member 35 of the leeward upper header section 5 at a position located leftward of the heat exchange tube 19 disposed at the left end. The communication opening 45, which is elongated in the front-rear direction as viewed from above, establishes communication between the two spaces 31 and 33 within the header section main body 24. A guide portion 46 is integrally formed at the left side edge of the communication opening 45 of the partition member 35. The guide portion 46 projects toward the first space 31, and guides refrigerant to flow rightward. Also, circular refrigerant passage holes 47 are formed in the partition member 35 at a central position and left-hand and right-hand positions with respect to the left-right direction such that the refrigerant passage holes 47 are located at the center in the front-rear direction.

Figure 7:
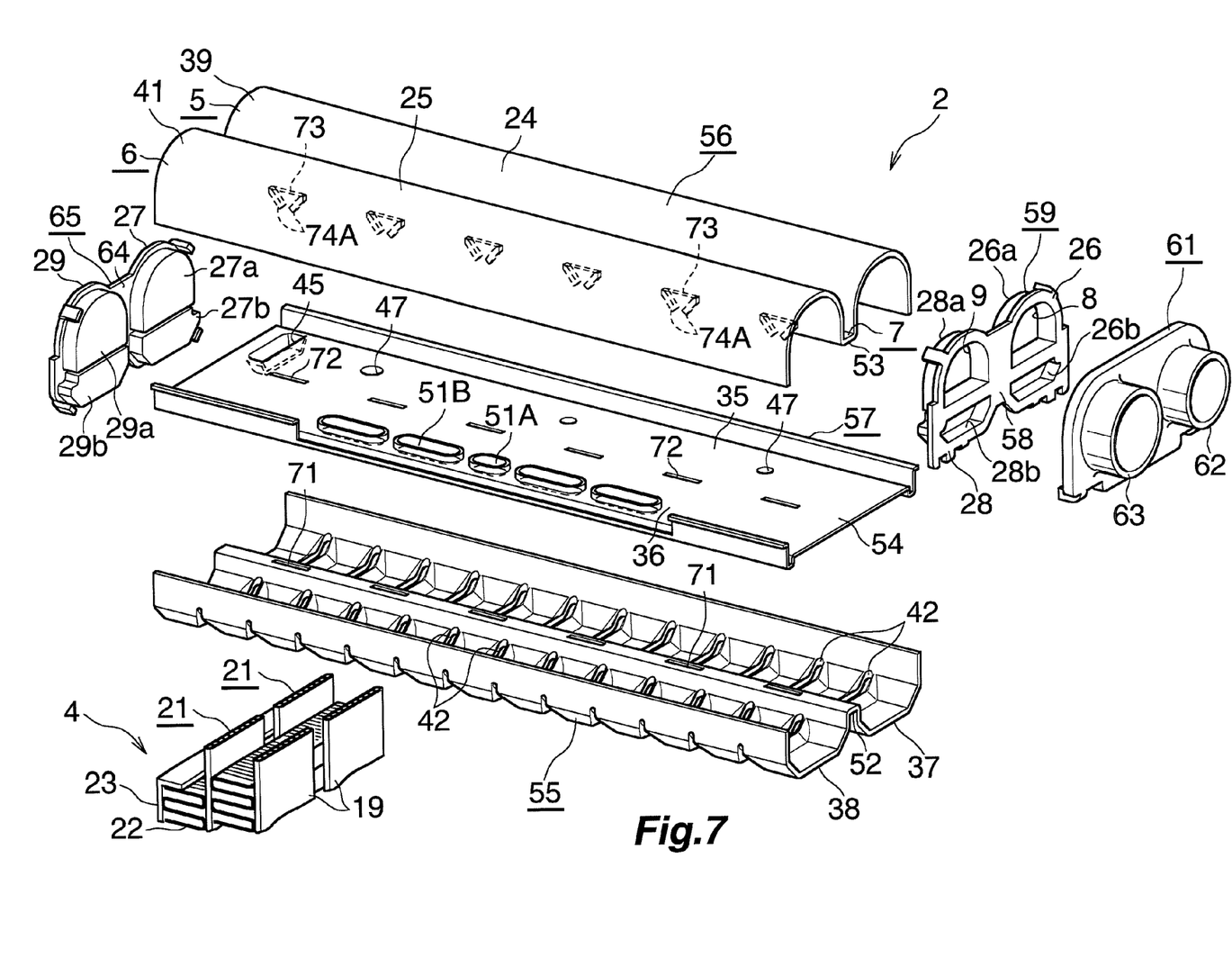
FIG. 7 is an exploded perspective view of a first header tank of the evaporator of FIG. 1.

In a rear portion of the partition member 36 of the windward upper header section 6, excluding portions near the left and right ends thereof, a plurality of oblong refrigerant passage holes 51A and 51B for establishing communication between the two spaces 32 and 34 of the header section main body 25 are formed such that they are spaced from one anther in the left-right direction.

The first members 37 and 38 which form the header section main bodies 24 and 25 of the leeward upper header section 5 and the windward upper header section 6 are connected together by a connection wall 52, which constitutes a connection portion 7, whereby a first tank constituting member 55 is formed. Similarly, the second members 39 and 41 which form the header section main bodies 24 and 25 of the leeward upper header section 5 and the windward upper header section 6 are connected together by a connection wall 53, which constitutes the connection portion 7, whereby a second tank constituting member 56 is formed. Also, the partition members 35 and 36 of the leeward upper header section 5 and the windward upper header section 6 are connected together by a connection wall 54, which constitutes the connection portion 7, whereby a third tank constituting member 57 is formed. The connection walls 52, 53, and 54 of the first through third tank constituting members 55, 56, and 57 are brazed together in a state in which they are laminated to form a laminar structure. Namely, the plate-shaped connection walls 52, 53, and 54 (plate-shaped portions), which are laminated so as to form a laminar structure, are provided on the first through third tank constituting members 55, 56, and 57, all the connection walls 52, 53, and 54 are brazed together, and the connection portion 7 is a lamination portion composed of all the connection walls 52, 53, and 54. The connection wall 53 of the second tank constituting member 56 is a first plate-shaped portion disposed at one end in the lamination direction, and the connection wall 52 of the first tank constituting member 55 is a second plate-shaped portion disposed at the other end in the lamination direction. Notably, each of the first and second tank constituting members 55 and 56 is formed by performing press work on an aluminum brazing sheet having a brazing material layer on each of opposite sides thereof. Also, the third tank constituting member 57 is formed by performing press work on aluminum bare material or an aluminum brazing sheet having a brazing material layer on each of opposite sides thereof.

The caps 26 and 28, which close the right end openings of the two header section main bodies 24 and 25, have upper projecting portions 26a and 28a which are fitted into right end portions of the second spaces 33 and 34 of the header section main bodies 24 and 25, and lower projecting portions 26b and 28b which are fitted into right end portions of the first spaces 31 and 32 of the header section main bodies 24 and 25. The two caps 26 and 28 are united by a connection portion 58 so as to form a single right end member 59, which is brazed to the two header section main bodies 24 and 25. The refrigerant inflow port 8, which communicates with the second space 33 of the header section main body 24 of the leeward upper header section 5, is formed in the projecting end wall of the upper projecting portion 26a of the front cap 26 of the right end member 59. Similarly, the refrigerant outflow port 9, which communicates with the second space 34 of the header section main body 25 of the windward upper header section 6, is formed in the projecting end wall of the upper projecting portion 28a of the rear cap 28 of the right end member 59.

A joint plate 61 formed of aluminum is brazed to the right end member 59. The joint plate 61 has a refrigerant inflow opening 62 communicating with the refrigerant inflow port 8 and a refrigerant outflow opening 63 communicating with the refrigerant outflow port 9. One end of the refrigerant inlet pipe 11 is inserted into and brazed to the refrigerant inflow opening 62 of the joint plate 61, and one end of the refrigerant outlet pipe 12 is inserted into and brazed to the refrigerant outflow opening 63 of the joint plate 61.

The caps 27 and 29, which close the left end openings of the two header section main bodies 24 and 25, have upper projecting portions 27a and 29a which are fitted into left end portions of the second spaces 33 and 34 of the header section main bodies 24 and 25, and lower projecting portions 27b and 29b which are fitted into left end portions of the first spaces 31 and 32. The two caps 27 and 29 are united by a connection portion 64 so as to form a single left end member 65, which is brazed to the two header section main bodies 24 and 25.

Figure 6:
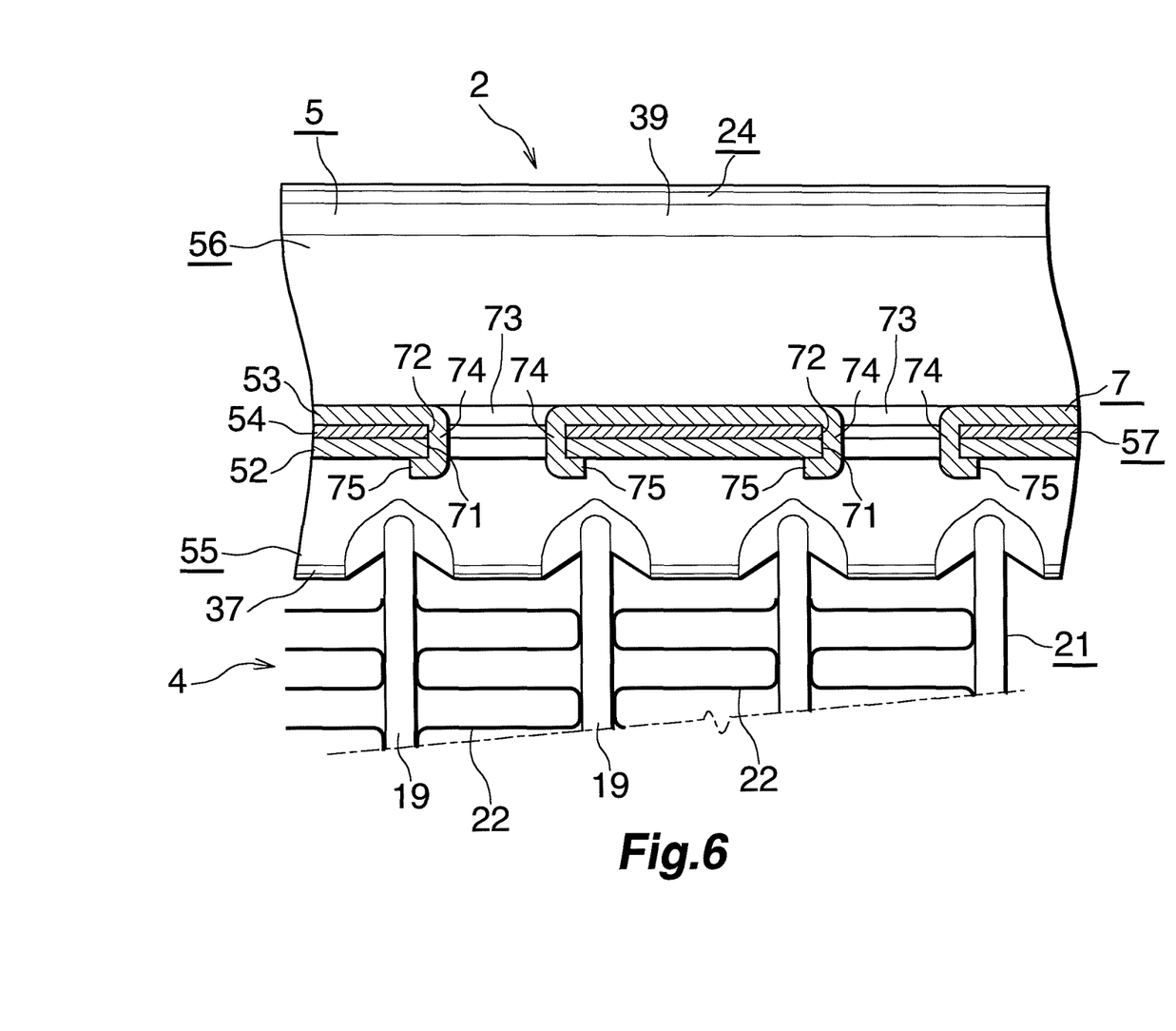
FIG. 6 is an enlarged sectional view taken along line E-E of FIG. 3.

As specifically shown in FIG. 6, elongated holes (through-holes) 71 and 72 are formed in the connection walls 52 and 54 of the first and third tank constituting members 55 and 57 (the plate-shaped portions excluding the first plate-shaped portion). The longitudinal direction of the elongated holes 71 and 72 coincides with the longitudinal direction of the first header tank 2. The length of the elongated holes 71 is equal to that of the elongated holes 72. The elongated holes 71 and 72 of the connection walls 52 and 54 of the first and third tank constituting members 55 and 57 are formed at the same positions with respect to the left-right direction (the longitudinal direction of the first header tank 2). Each of the elongated holes 71 and 72 of the first and third tank constituting members 55 and 57 has a length at least two times the dimension of the two connection walls 52 and 54 in the thickness direction; i.e., a dimension obtained by subtracting the thickness of the connection wall 53 (the first plate-shaped portion) of the second tank constituting member 56 from the thickness of the connection portion 7 (the lamination portion) composed of all the connection walls 52, 53, and 54.

Elongated holes (through-holes) 73 whose longitudinal direction coincides with the left-right direction are formed in the connection wall 53 of the second tank constituting member 56 at positions corresponding to the positions of the elongated holes 71 and 72 of the first and third tank constituting members 55 and 57. The connection wall 53 has claws 74 formed at opposite ends of each elongated hole 73 of the connection wall 53. The claws 74 are in close contact with opposite end wall surfaces of the corresponding elongated holes 71 and 72 of the connection walls 52 and 54 of the first and third tank constituting members 55 and 57, and project downward from the connection wall 52 of the first tank constituting member 55. Distal end portions of the claws 74 are bent outward with respect to the left-right direction, and are engaged with portions of the lower surface of the connection wall 52 of the first tank constituting member 55 (the outer surface of the plate-shaped portion with respect to the lamination direction), portions being located at the opposite ends of the corresponding elongated hole 71. The outward bent portions (fold-back portion) of the claws 74 are denoted by reference numeral 75.

As shown in FIGS. 2, 3, 5, and 8, the leeward lower header section 13 of the second header tank 3 is composed of a header section main body 24 which is open at opposite ends thereof; caps 26 and 27 which close the opposite end openings of the header section main body 24, and a partition member 35 which divides the interior of the header section main body 24 into a first space 31 which is located on the side toward the heat exchange core section 4 (the upper side) and with which the heat exchange tubes 19 communicate and a second space 33 located on the side opposite the heat exchange core section 4 (the lower side). Similarly, the windward lower header section 14 of the second header tank 3 is composed of a header section main body 25 which is open at opposite ends thereof; caps 28 and 29 which close the opposite end openings of the header section main body 25, and a partition member 36 which divides the interior of the header section main body 25 into a first space 32 which is located on the side toward the heat exchange core section 4 (the upper side) and with which the heat exchange tubes 19 communicate and a second space 34 located on the side opposite the heat exchange core section 4 (the lower side). The first header tank 2 and the second header tank 3 are substantially identical in structure and are disposed in a mirror-image relation. Therefore, the same portions are denoted by the same reference numerals.

Figure 8:
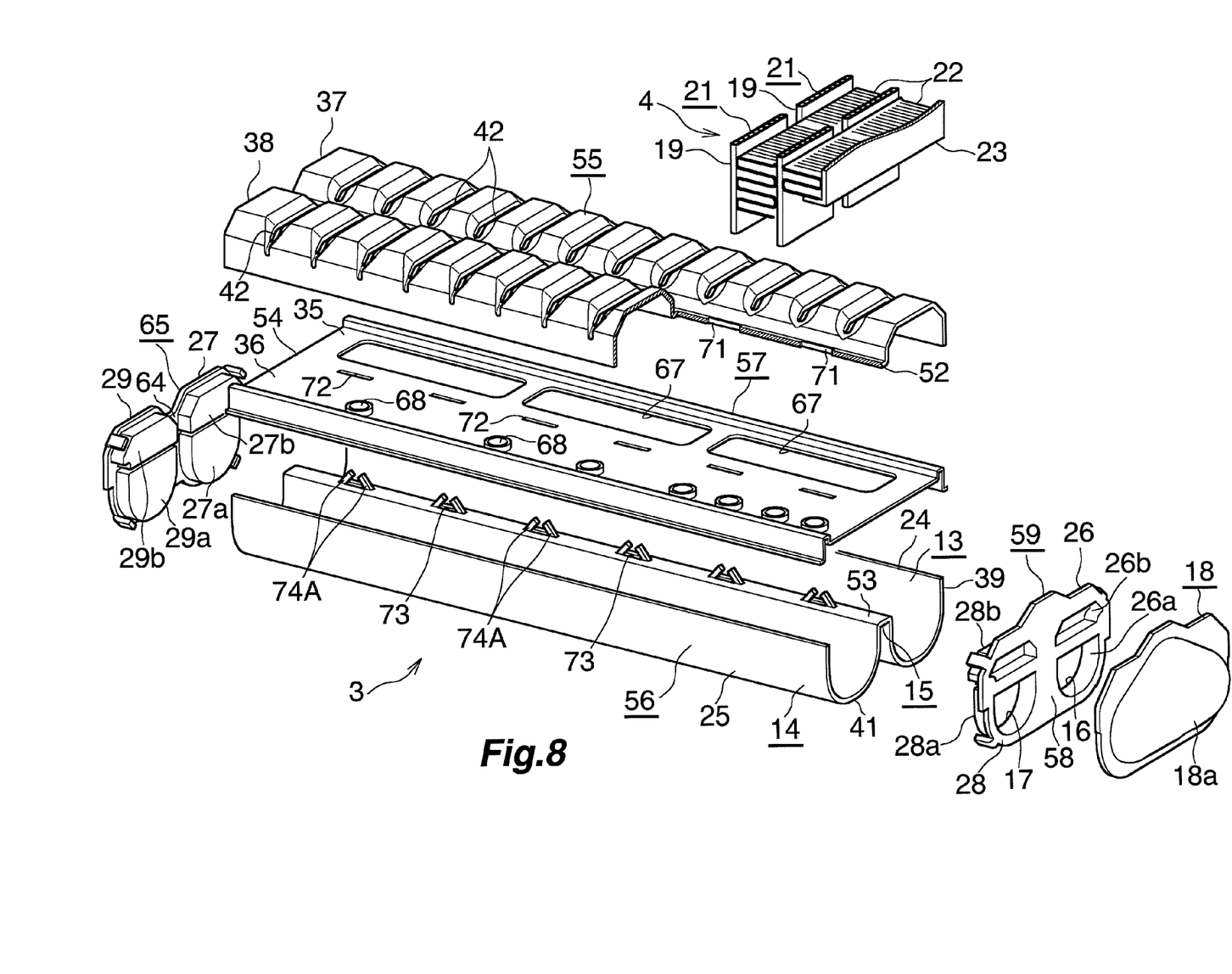
FIG. 8 is an exploded perspective view of a second header tank of the evaporator of FIG. 1.

Notably, the first members 37 and 38 of the header section main bodies 24 and 25 of the second header tank 3 form portions (upper portions) of the header section main bodies 24 and 25 located on the side toward the heat exchange core section 4, and lower end portions of the heat exchange tubes 19 of the front and rear heat exchange tube groups 21 are connected o the first members 37 and 38. Similarly, the second members 39 and 41 form the remaining portions (lower portions) of the header section main bodies 24 and 25.

The second header tank 3 differs from the first header tank 2 in the following points.

The first difference: the refrigerant outflow port 16 is formed in the projecting end wall of the projecting portion 26a of the cap 26, which closes the right end opening of the header section main body 24 of the leeward lower header section 13, and the refrigerant inflow port 17 is formed in the projecting end wall of the projecting portion 28a of the cap 28, which closes the right end opening of the header section main body 25 of the windward lower header section 14.

The second difference: the outer shape of the right end member 59 which is brazed to the header section main bodies 24 and 25 of the leeward and windward lower header sections 13 and 14 differs from the outer shape of the right end member 59 which is brazed to the header section main bodies 24 and 25 of the leeward and windward upper header sections 5 and 6, and, in place of the joint plate 61, the communication member 18 is brazed to the right end member 59. The communication member 18 has an outward bulging portion 18a, and the interior space of the communication member 18 serves as a passage 66 for establishing communication between the refrigerant outflow port 16 of the leeward lower header section 13 and the refrigerant inflow port 17 of the windward lower header section 14.

The third difference: the communication opening 45, the guide portion 46, and the circular refrigerant passage holes 47 are not formed in the partition member 35 of the header section main body 24 of the leeward lower header section 13, and communication holes 67 elongated in the left-right direction are formed in the partition member 35 so as to establish communication between the first and second spaces 31 and 33 of the header section main body 24 of the leeward lower header section 13.

The fourth difference: the oblong refrigerant passage holes 51A and 51B are not formed in the partition member 36 of the header section main body 25 of the windward lower header section 14, and a plurality of circular refrigerant passage holes 68 are formed in the partition member 36 such that they are spaced from one another in the left-right direction.

The above-described evaporator 1 is manufactured by assembling all components, excluding the inlet pipe 11 and the outlet pipe 12, provisionally fixing the components, and brazing the all components together in a furnace.

Figure 9:
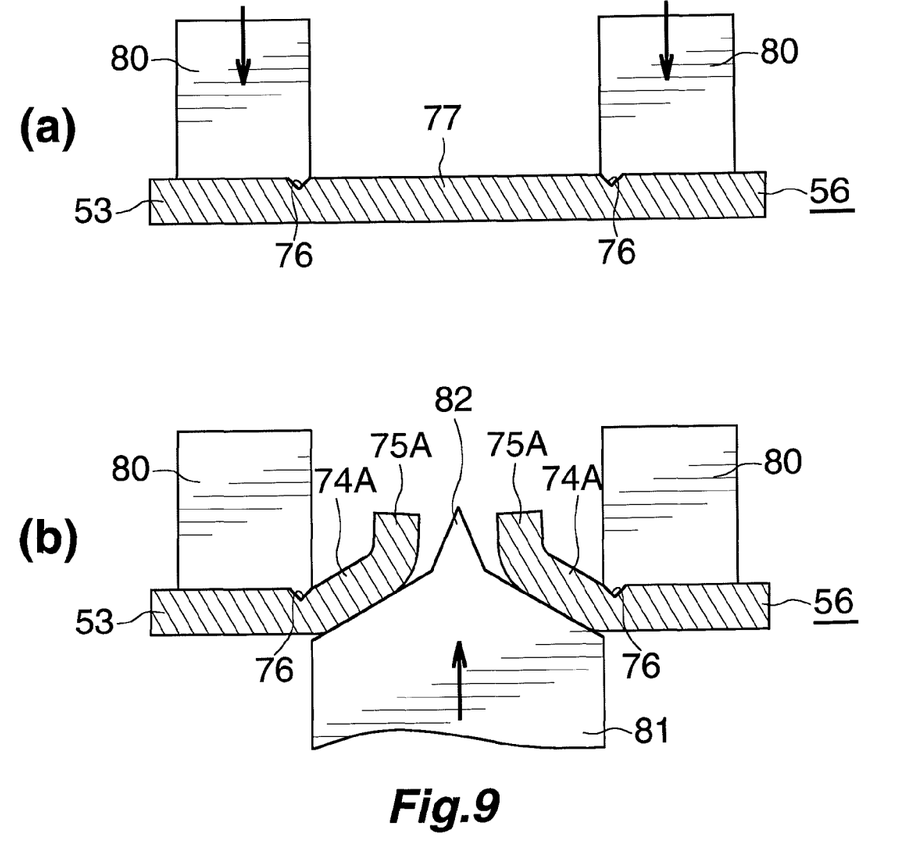
FIG. 9 is a view showing one step of a method of manufacturing the evaporator of FIG. 1.
Figure 10:
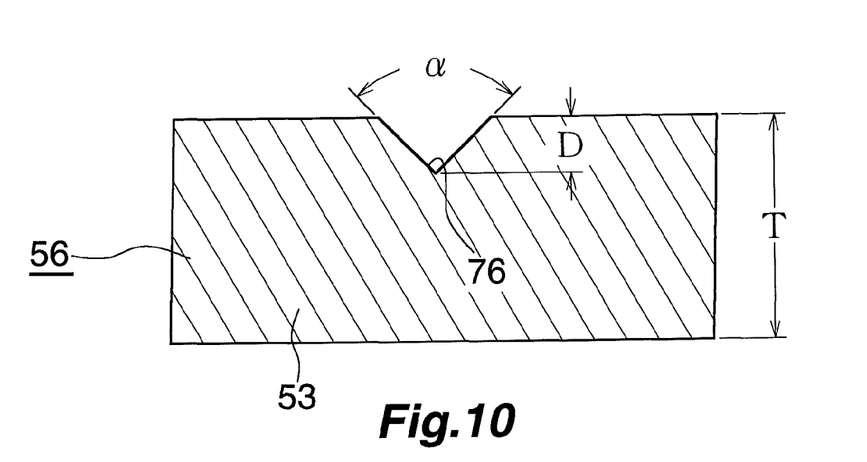
FIG. 10 is a view showing another step of the method of manufacturing the evaporator of FIG. 1, the step being different from that shown in FIG. 9.
Figure 11:
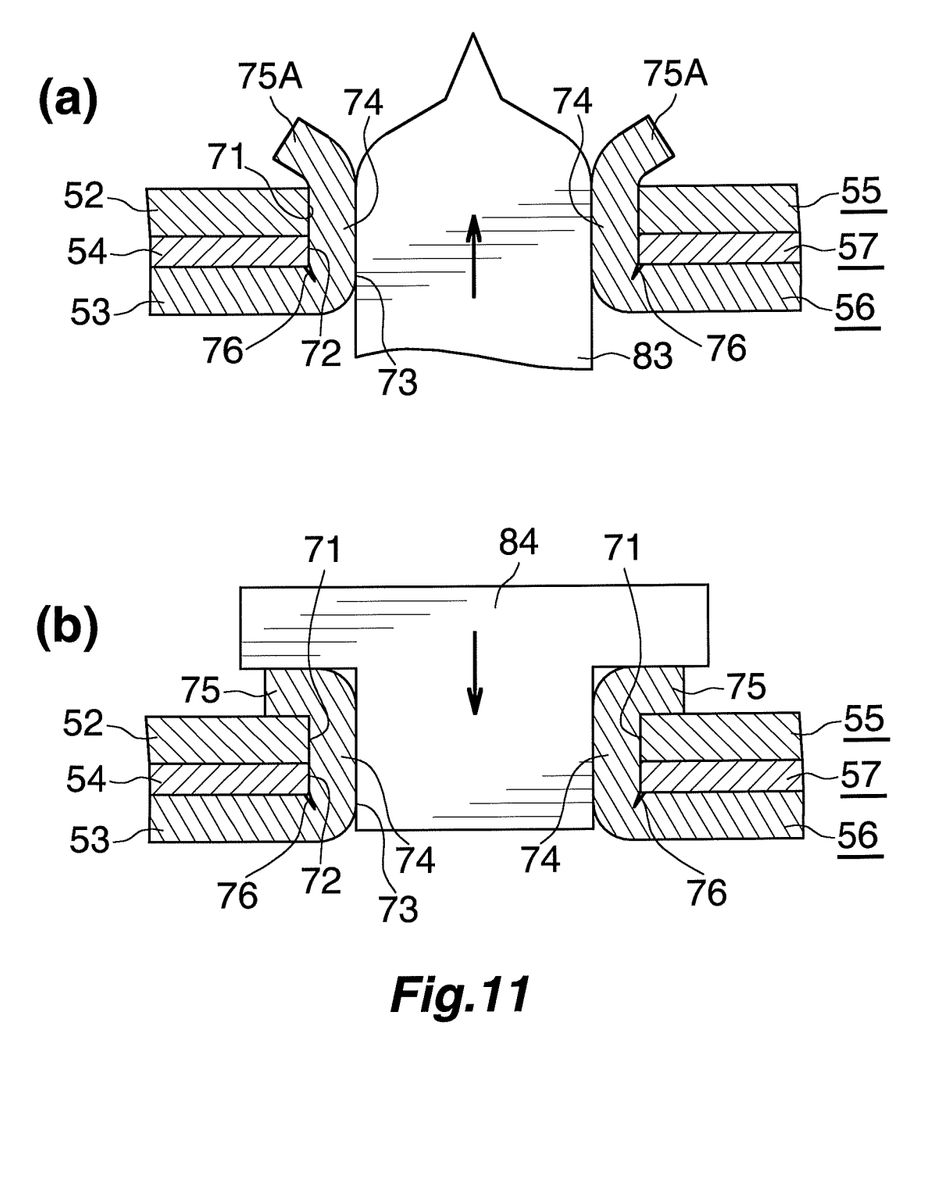
FIG. 11 is a view showing still another step of the method of manufacturing the evaporator of FIG. 1, the step being different from those shown in FIGS. 9 and 10.

Next, a method of provisionally fixing the first through third tank constituting members 55, 56, and 57, which constitute the two header tanks 2 and 3, in a process of manufacturing the evaporator 1 will be described with reference to FIGS. 9 to 11.

First, the elongated holes 71 and 72 are formed in the connection walls 52 and 54 of the first and third tank constituting members 55 and 57. Also, through use of a die 80, bending notches 76 having a V-shaped transverse cross section are formed on a surface of the connection wall 53 of the second tank constituting member 56, which surface faces the connection wall 54 of the third tank constituting member 57. The bending notches 76 are formed such that one bending notch 76 is formed at a position corresponding to one end of each of the elongated holes 71 and 72 of the first and third tank constituting members 55 and 57 with respect to the longitudinal direction or a position located inward of the one end of each of the elongated holes 71 and 72, and another bending notch 76 is formed at a position corresponding to the other end of each of the elongated holes 71 and 72 of the first and third tank constituting members 55 and 57 with respect to the longitudinal direction or a position located inward of the other end of each of the elongated holes 71 and 72. In the present embodiment, one bending notch 76 is formed at a position corresponding to one end of each of the elongated holes 71 and 72 of the first and third tank constituting members 55 and 57 with respect to the longitudinal direction, and another bending notch 76 is formed at a position corresponding to the other end of each of the elongated holes 71 and 72 with respect to the longitudinal direction (see FIG. 9(a)). A portion of the connection wall 53 between the two notches 76 serves as a claw forming portion 77. As shown in FIG. 10, preferably, the depth D (mm) of the notches 76 and the thickness T (mm) of the connection wall 53 of the second tank constituting member 56 satisfy a relation $0.1T \leq D \leq 0.5T$. Also, preferably, the angle $\alpha$ between the opposite side surfaces of the notch 76 as measured on a transverse cross section thereof is 30 to 120 degrees.

Subsequently, through use of a die 81, a longitudinally intermediate portion of the claw forming portion 77 of the connection wall 53 of the second tank constituting member 56, which is to face the corresponding elongated holes 71 and 72, is pressed toward the side opposite the second members 39 and 41. Thus, the claw forming portion 77 is broken at the center in the longitudinal direction, and is bent at positions corresponding to the notches 76 so as to form two claw forming pieces 74A, which incline toward the other end in the lamination direction as approaching the distal ends thereof. Simultaneously with this, bent portions 75A are formed at the distal ends of the two claws forming pieces 74A such that the bent portions 75A are bent outward in relation to the claws forming pieces 74A (see FIG. 9(b)). The distal end surface of the die 81 inclines such that a central portion thereof in the width direction projects upward by the greatest amount. Also, a breaking portion 82 having a sharp end is formed at the central portion in the width direction such that the breaking portion 82 projects upward. Notably, in FIGS. 7 and 8, the claws forming pieces 74A for forming the claws 74 are shown.

Subsequently, the first through third tank constituting members 55, 56, and 57 are assembled such that the connection walls 52, 53, and 54 are laid one on top of another (i.e., laminated), and the claws forming pieces 74A of the second tank constituting member 56 are inserted into the elongated holes 71 and 72 of the first and third tank constituting members 55 and 57. Subsequently, through use of a die 83, the two claws forming pieces 74A are bent at the notches 76 upward (toward the connection wall 52 of the first tank constituting member 55). Thus, the claws forming pieces 74A are forced to extend along the opposite end wall surfaces of the elongated holes 71 and 72 of the first and third tank constituting members 55 and 57. As a result, the claws 74 are formed such that their distal end portions project outward from the connection wall 52 of the first tank constituting member 55 (see FIG. 11(a)). After that, through use of a die 84, portions of the two claws 74 which project outward from the connection wall 52 of the first tank constituting member 55 are bent outward in the left-right direction so as to form fold-back portions 75. The fold-back portions 75 are brought into contact with the outer surface of the connection wall 52 with respect to the lamination direction (see FIG. 11(b)). Thus, the first through third tank constituting members 55, 56, and 57 are provisionally fixed together.

Although not illustrated, in the above-described method, notches for forming the bending portions 75A may be formed on the claw forming portion 77 when the notches 76 are formed thereon.

In the above-described embodiment, the entire leeward header section 5 of the first header tank 2 serves as a refrigerant inlet header section, the entire windward header section 6 of the first header tank 2 serves as a refrigerant outlet header section, the entire leeward header section 13 of the second header tank 3 serves as a first intermediate header section, and the entire windward header section 14 of the second header tank 3 serves as a second intermediate header section. However, the present invention is not limited to such a structure. For example, the structure may be may be modified such that the interior of the leeward header section of the first header tank 2 is divided into a plurality of sections arranged in the longitudinal direction of the first header tank 2, the section at either of the opposite ends serves as a refrigerant inlet header section, the interior of the windward header section of the first header tank 2 is divided into a plurality of sections arranged in the longitudinal direction of the first header tank 2, and the section at either of the opposite ends serves as a refrigerant outlet header section.

What is claimed is:

1. A method of manufacturing a heat exchanger which includes a pair of header tanks disposed apart from each other, and a plurality of heat exchange tubes which are disposed between the two header tanks and whose opposite end portions are connected to the corresponding header tanks, wherein at least one of the header tanks is formed by a plurality of tank constituting members having a plurality of plate-shaped portions which are laminated to form a lamination portion, and, at the lamination portion composed of the plurality of plate-shaped portions, at least two claws provided on a first plate-shaped portion disposed at one end of the lamination portion with respect to a lamination direction are passed through elongated holes, which are through-holes, which are formed in the plate-shaped portions and which extend in a longitudinal direction of the header tanks, the claws are bent such that distal end portions of the claws are engaged with an outer surface, with respect to the lamination direction, of a second plate-shaped portion disposed at the other end of the lamination portion with respect to the lamination direction, at positions corresponding to opposite ends of the elongated holes with respect to the longitudinal direction, and the plate-shaped portions of the plurality of tank constituting members are brazed together in this state, the method comprising:

forming elongated holes in all of the plate-shaped portions which constitute the lamination portion, excluding the first plate-shaped portion, such that each of the elongated holes extends in the longitudinal direction of the header tanks and has a length at least two times a dimension obtained by subtracting a thickness of the first plate-shaped portion from a thickness of the lamination portion;

forming bending notches on a surface of a claw forming portion of the first plate-shaped portion which faces the elongated holes, the surface facing the adjacent plate-shaped portion, such that one bending notch is formed at one end of each elongated hole with respect to the longitudinal direction or at a position shifted from the one end toward an inside of the elongated hole, and another bending notch is formed at the other end of the elongated hole with respect to the longitudinal direction or at a position shifted from the other end toward the inside of the elongated hole;

pressing an intermediate portion of the claw forming portion of the first plate-shaped portion with respect to the longitudinal direction toward the other end with respect to the lamination direction of the plurality of plate-shaped portions so as to break the claw forming portion at a center with respect to the longitudinal direction and bend the claw forming portion at the notches, to thereby form two claws forming pieces which incline toward the other end in the lamination direction and to form bent portions at distal ends of the claws forming pieces such that the bent portions are bent outward in relation to the claws forming pieces;

laminating the plate-shaped portions of all the tank constituting members such that the elongated holes of the plate-shaped portions, excluding the first plate-shaped portion, positionally coincide with each other, and the claws forming pieces of the first plate-shaped portion are located in the elongated holes of the remaining plate-shaped portions;

bending the claws forming pieces of the first plate-shaped portion at the notches toward the other end in the lamination direction so as to form claws which are in close contact with a wall surface of each elongated hole at opposite ends thereof and to cause distal end portions of the claws to project outward from the second plate-shaped portion in the lamination direction; and bending portions of the claws of the first plate-shaped portion, the portions projecting outward from the second plate-shaped portion, toward the outside of the elongated holes with respect to the longitudinal direction thereof so as to form fold-back portions, and bringing the fold-back portions into contact with an outer surface of the second plate-shaped portion with respect to the lamination direction, whereby all the tank constituting members are provisionally fixed together.

2. A method of manufacturing a heat exchanger according to claim 1, wherein a relation $0.1T \leq D \leq 0.5T$ is satisfied, where D represents the depth (mm) of the notches formed on the first plate-shaped portion, and T represents the thickness (mm) of the first plate-shaped portion.

3. A method of manufacturing a heat exchanger according to claim 1, wherein each of the notches formed on the first plate-shaped portion has a V-shaped transverse cross section, and an angle formed between two side surface of each notch as measured on the transverse cross section is 30 to 120 degrees.

4. A method of manufacturing a heat exchanger according to claim 1, wherein notches for forming the bent portions on the claws are formed on the claw forming portion of the first plate-shaped portion which faces the elongated holes.

5. A method of manufacturing a heat exchanger according to claim 1, wherein
the heat exchanger includes a first header tank of the pair of header tanks which is composed of a first tank constituting member to which the heat exchange tubes are connected, a second tank constituting member which is joined to the first tank constituting member and which covers a side of the first tank constituting member opposite the heat exchange tubes, and a third tank constituting member which is disposed between the first tank constituting member and the second tank constituting member; and
the plate-shaped portions, which are laminated to form the lamination portion, are provided on the first through third tank constituting members, the notches are formed on the plate-shaped portion of the first tank constituting member or the second tank constituting member, and the elongated holes are formed in the plate-shaped portions of the remaining tank constituting members.

* * * * *